No. 724,475. PATENTED APR. 7, 1903.
A. HILMO.
TOOL HANDLE.
APPLICATION FILED NOV. 7, 1902.
NO MODEL.
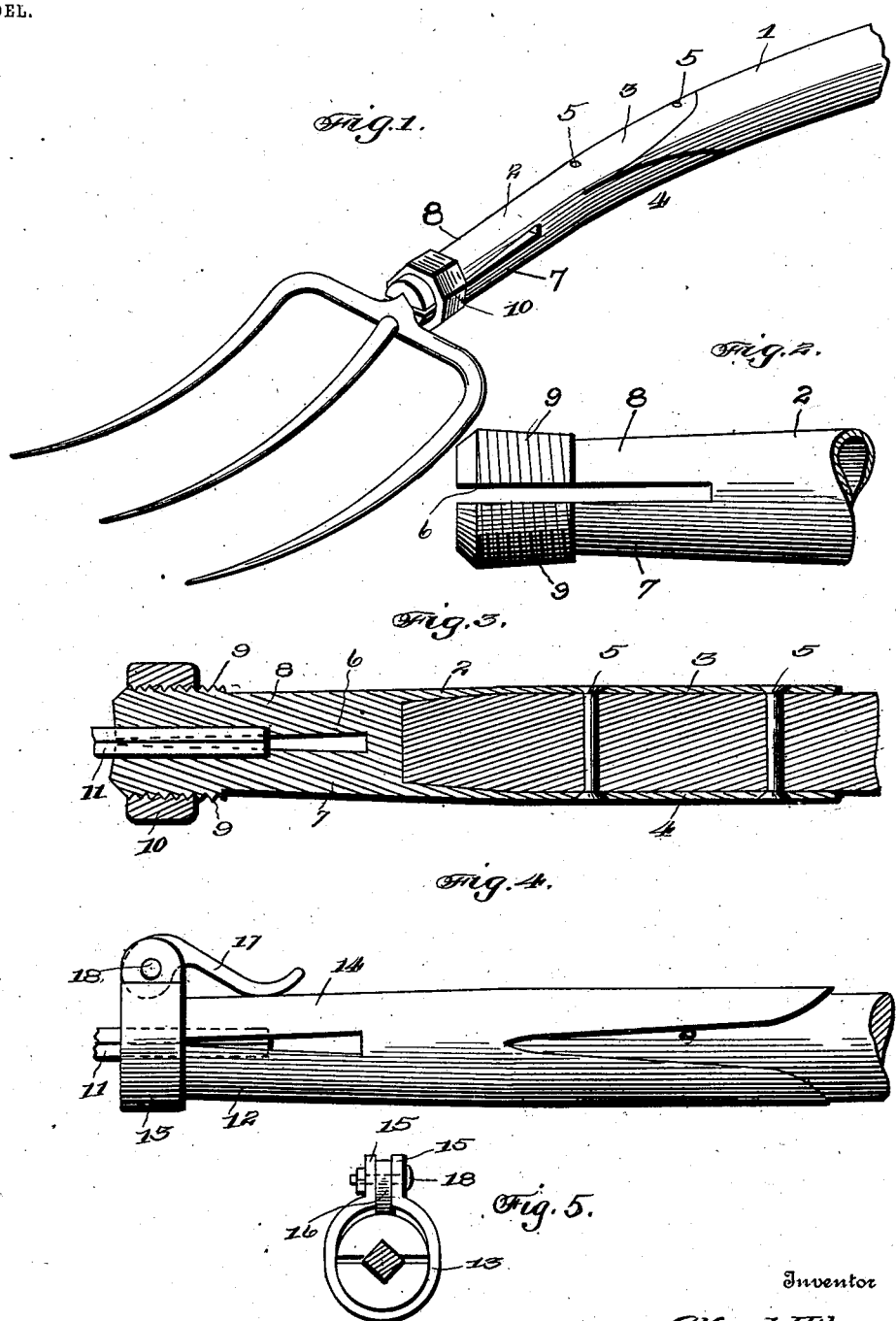
Inventor
Alfred Hilmo
Witnesses
R. A. Boswell
A. D. Crown
By W. T. Fitz Gerald
Attorneys

UNITED STATES PATENT OFFICE.

ALFRED HILMO, OF WAUKON, IOWA.

TOOL-HANDLE.

SPECIFICATION forming part of Letters Patent No. 724,475, dated April 7, 1903.

Application filed November 7, 1902. Serial No. 130,441. (No model.)

*To all whom it may concern:*

Be it known that I, ALFRED HILMO, a citizen of the United States, residing at Waukon, in the county of Allamakee and State of Iowa, have invented certain new and useful Improvements in Tool-Handles; and I do hereby declare the following to be a full, clear, and exact description of the invention, such as will enable others skilled in the art to which it appertains to make and use the same.

My invention relates to certain new and useful improvements in tool-handles or the like; and it consists of certain novel features of combination and construction of parts, the preferred form whereof will be hereinafter clearly set forth, reference being had to the accompanying drawings, which are made a part of this application.

The object of my invention, among others, is to provide simple though reliably efficient means for enabling the tools to be readily attached in their operative position to the handle and as easily removed therefrom for the purpose of replacement or repair of said tools.

Other objects and advantages will be hereinafter made clearly apparent, reference being had to the accompanying drawings, in which—

Figure 1 is a perspective view showing my invention complete, the free end of the handle being broken away. Fig. 2 is a detail view showing a side elevation of the extreme lower end of the handle. Fig. 3 is a longitudinal central section of the lower end of the handle and a portion of the shank of the tool clamped in position. Figs. 4 and 5 show other forms of construction which may be adopted in providing the clamp for the tool-shank.

The various details of my invention and elements required to coöperate therewith will be designated by numerals, the same numeral referring to a similar part throughout the several views.

In carrying out my invention I provide a handle 1, of the usual or any preferred form, to which I secure in the ordinary way a socket 2, preferably having the upper and lower branches 3 and 4, whereby the properly-shaped end of the handle 1 may be secured within the socket 2 and therein held by suitable rivets or screws 5, as is common. The socket 2 is preferably made solid at its other end, and said end is split transversely to provide the opening 6, as shown in Figs. 2 and 3, whereby the branches 7 and 8 are separated from each other. Each of the branches 7 and 8 is provided at its outer end with a slightly-conical head provided with a threaded exterior 9, as shown, and upon this conical head I dispose the locking-nut or internally-threaded collar 10, and when said collar is forced outward upon its conical seat it is obvious that the ends of the branches or members 7 and 8 will be drawn tightly toward each other, and thereby firmly secure and clamp the shank 11 of the tool which may have been interposed in a properly-formed seat provided in the meeting faces of said members 7 and 8. It is therefore obvious that by moving the collar 10 outward upon the end of the members 7 and 8 by reason of the conical seat 9 above described the shank of the tool can be firmly locked in place, while a reverse movement of the collar will cause the ends of the members 7 and 8 to spring apart sufficiently to readily release the shank 11, when it may be quickly replaced by a new tool.

By the use of my improved securing device for tool-handles the same handle may be employed for a variety of purposes, inasmuch as a fork-shank may be readily removed and replaced by the shank of a rake, the same handle being found useful for such purpose. It is further obvious that a hoe-shank may be readily inserted in connection with the same handle. It is further obvious that if any of the tines of a fork or rake should become broken such fork or rake may be bodily replaced at will, thereby avoiding the necessity of purchasing an entire new handle, as is common.

By the use of my improved handle manufacturers placing the same upon the market could supply each handle with a number of interchangeable attachments, thus fitting the handle for a variety of uses, as a rake, hoe, fork, or other tools of this class.

In Figs. 4 and 5 the construction is substantially the same with the exception that the threaded conical seat 9 is removed and the member 12, which corresponds to the member 7 in Fig. 3, has secured to it a collar 13, which latter extends around said member 12 and the complementing member 14, corresponding to the member 8 in Fig. 3.

As will be seen by reference to Fig. 5, the collar 13 is so formed as to be provided with the parallel ears 15, between which I pivotally secure the cam-head 16 of the lever 17, said head being pivotally secured in place between the ears by the rivet or bolt 18, as clearly shown.

By reference to the foregoing description it is therefore obvious that when it is necessary to release the shank 11 of the tool all that is necessary to be done is to elevate the free end of the handle 17 and bring the same substantially at right angles to the plane of the fork-handle, when the cam-head will be elevated out of engagement with the member 14 and permit the members 12 and 14 to spring apart by their own tensile properties, and thereby release the shank, which may be quickly renewed and replaced, as hereinbefore explained.

While I have shown that the separated members 7 and 8 or 12 and 14 may be thus brought together into a locked position upon the shank of the tool, I desire to reserve the right to use either form of device which in practice I may find most reliable and efficient.

While I have described the preferred combination and construction of parts necessary in providing a clamping means for the shank of a fork or other tools of this class, I wish to comprehend in this application all substantial equivalents and substitutes as may be considered as falling fairly within the scope of my invention.

Having thus fully described my invention, what I claim as new, and desire to secure by Letters Patent, is—

The combination with a suitable handle, of a socket secured thereto, said socket having at its other end separated spring clamping members; a collar operatively disposed upon the ends of said members; ears carried by said collar and a cam-lever pivotally secured between said ears whereby the shank is secured or released, substantially as set forth.

In testimony whereof I affix my signature in presence of two witnesses.

ALFRED HILMO.

Witnesses:
H. G. JOHNSON,
E. D. PURDY.